(12) United States Patent
Kim et al.

(10) Patent No.: US 10,371,976 B2
(45) Date of Patent: Aug. 6, 2019

(54) DISPLAY DEVICE FOR RECOGNIZING UNIFORM INTENSITY OF TOUCH

(71) Applicant: Samsung Display Co., Ltd., Yongin-Si, Gyeonggi-Do (KR)

(72) Inventors: Yeon Tae Kim, Yongin-si (KR); A Ra Jo, Yongin-si (KR)

(73) Assignee: Samsung Display Co., Ltd. (KR)

( * ) Notice: Subject to any disclaimer, the term of this patent is extended or adjusted under 35 U.S.C. 154(b) by 84 days.

(21) Appl. No.: 15/642,917

(22) Filed: Jul. 6, 2017

(65) Prior Publication Data

US 2018/0011361 A1    Jan. 11, 2018

(30) Foreign Application Priority Data

Jul. 6, 2016 (KR) .......................... 10-2016-0085776

(51) Int. Cl.

| | | |
|---|---|---|
| *G02F 1/17* | (2019.01) | |
| *G06F 3/041* | (2006.01) | |
| *G06F 3/044* | (2006.01) | |
| *G02F 1/1333* | (2006.01) | |
| *G02F 1/1335* | (2006.01) | |

(52) U.S. Cl.
CPC .... *G02F 1/13336* (2013.01); *G02F 1/133308* (2013.01); *G02F 1/178* (2013.01); *G06F 3/044* (2013.01); *G06F 3/0414* (2013.01); *G06F 3/0418* (2013.01); *G02F 2001/133354* (2013.01); *G02F 2001/133545* (2013.01); *G06F 2203/04103* (2013.01); *G06F 2203/04105* (2013.01)

(58) Field of Classification Search
CPC ................ G06F 3/0414; G06F 3/0416; G06F 2203/04105; G06F 3/04886; G02F 1/133308
See application file for complete search history.

(56) References Cited

U.S. PATENT DOCUMENTS

| | | | |
|---|---|---|---|
| 6,982,432 B2 | 1/2006 | Umemoto et al. | |
| 9,170,164 B2 | 10/2015 | Naegele-Preissmann et al. | |
| 2013/0229350 A1* | 9/2013 | Shaw | ................... G06F 1/1618 345/168 |
| 2015/0153951 A1 | 6/2015 | Kim et al. | |
| 2016/0209984 A1* | 7/2016 | Richards | ............... G06F 3/0418 |

(Continued)

FOREIGN PATENT DOCUMENTS

| | | |
|---|---|---|
| JP | 07-243929 A | 9/1995 |
| JP | 2001-290135 A | 10/2001 |

(Continued)

*Primary Examiner* — Laurence J Lee
(74) *Attorney, Agent, or Firm* — Innovation Counsel LLP (57) ABSTRACT

A display deice capable of recognizing a uniform intensity of a touch regardless of a position of a touch input. The display device includes a display panel including a first area and a second area surrounding the first area, a plurality of pressure sensors disposed on the display panel, a dielectric layer disposed on the plurality of pressure sensors, and a bracket accommodating the display panel, the plurality of pressure sensors, and the dielectric layer. The dielectric layer forms a capacitance between the plurality of pressure sensors and the bracket. A first capacitance corresponding to the first area is smaller than a second capacitance corresponding to the second area.

13 Claims, 9 Drawing Sheets

(56) References Cited

U.S. PATENT DOCUMENTS

2017/0031476 A1\* 2/2017 Kung ...................... G06F 3/044
2017/0262110 A1\* 9/2017 Polishchuk ............. G06F 3/041

FOREIGN PATENT DOCUMENTS

| JP | 2009-176245 A | 8/2009 |
| --- | --- | --- |
| JP | 2011-086191 A | 4/2011 |
| KR | 10-2015-0004792 A | 1/2015 |
| KR | 10-1506511 A | 3/2015 |
| KR | 10-2015-0108875 A | 9/2015 |
| KR | 10-1553786 A | 9/2015 |
| KR | 10-1686539 A | 12/2016 |

\* cited by examiner

DISPLAY DEVICE FOR RECOGNIZING UNIFORM INTENSITY OF TOUCH

CROSS-REFERENCE TO RELATED APPLICATION

This application claims priority to and the benefit of Korean Patent Application No. 10-2016-0085776 filed on Jul. 6, 2016 in the Korean Intellectual Property Office, the disclosure of which is incorporated herein by reference in its entirety.

BACKGROUND

Field

The present disclosure relates to a display device, more particularly, to a display device with an integrated pressure sensor unit.

Description of the Related Art

As the interest in information displays and demands for portable information media have increased, the research on and commercialization of display devices have been focused on not only improving an image quality but also providing interactivity with a user.

A touch-enabled display device has an integrated touch sensor for receiving a user's touch in addition to displaying an image. Accordingly, a user may use a display device to view a displayed image and interactively respond to the displayed image through the touch sensor.

Recently, it has been attempted to provide a variety of interactive functions to the user using not only for detecting a touch position but also a pressure generated due to a user's touch.

SUMMARY

According to an aspect of the present disclosure, a display device detecting an intensity of a touch is provided.

According to another aspect of the present disclosure, a display device is capable of recognizing a uniform intensity of a touch regardless of a position of a touch input.

According to an embodiment of the present disclosure, a display device may include a display panel including a first area and a second area surrounding the first area, a plurality of pressure sensors disposed on the display panel, a dielectric layer disposed on the plurality of pressure sensors, and a bracket accommodating the display panel, the plurality of pressure sensors, and the dielectric layer. The dielectric layer forms a capacitance between the plurality of pressure sensors and the bracket. A first capacitance corresponding to the first area is smaller than a second capacitance corresponding to the second area.

The dielectric layer may include a first dielectric layer and a second dielectric layer, and a first dielectric constant of the first dielectric layer may be smaller than a second dielectric constant of the second dielectric layer.

The first dielectric layer may overlap the first area, and the second dielectric layer may overlap the second area.

The first dielectric layer may include a first hole.

The second dielectric layer may include a second hole, and a number of first holes provided in a unit area of the first area may be greater than a number of second holes provided in the unit area of the second area.

The second dielectric layer may include a second hole having a second radius that is smaller than a first radius of the first hole.

The second dielectric layer may include a second hole, and a second height of the second hole may be smaller than a first height of the first hole.

The first hole may be formed through the first dielectric layer, and the second hole may be formed by removing a portion of the second dielectric layer.

The first area may include a center area of the display panel.

The first dielectric layer and the second dielectric layer may be made of materials having different dielectric constants from each other.

The bracket may include a first cavity and a second cavity, and the first cavity may overlap the first area, and the second cavity may overlap the second area.

A step may be formed between the first cavity and the second cavity and a bottom surface of the bracket has a stepped shape.

A distance between the pressure sensors disposed on the first area and the bracket corresponding to the first cavity may be greater than a distance between the pressure sensors disposed on the second area and the bracket corresponding to the second cavity.

A display device may further include a sensor controller calculating an intensity of a touch with reference to a variation in the capacitance between the plurality of pressure sensors and the bracket and correction constants.

A first correction constant applied when the touch is input to the first area may be different from a second correction constant applied when the touch is input to the second area.

DETAILED DESCRIPTION

The details of exemplary embodiments of the present disclosure are included in the detailed description and the drawings.

The advantages and features of the present disclosure, and how to accomplish them will be described with reference to the embodiments described below in detail with reference to the accompanying drawings. However, the present disclosure is not limited to the embodiments described herein but may be embodied in other forms. It is also noted that in the present disclosure, "coupling/coupled" refers to one component not only directly coupling another component but also indirectly coupling another component through an intermediate component. In addition, in the drawings, the same or similar constituent elements may be denoted by the same reference numerals and marks in different drawings.

Hereinafter, a display device according to an embodiment of the present disclosure will be described with reference to the drawings related to the embodiments of the present disclosure.

Figure 1A:
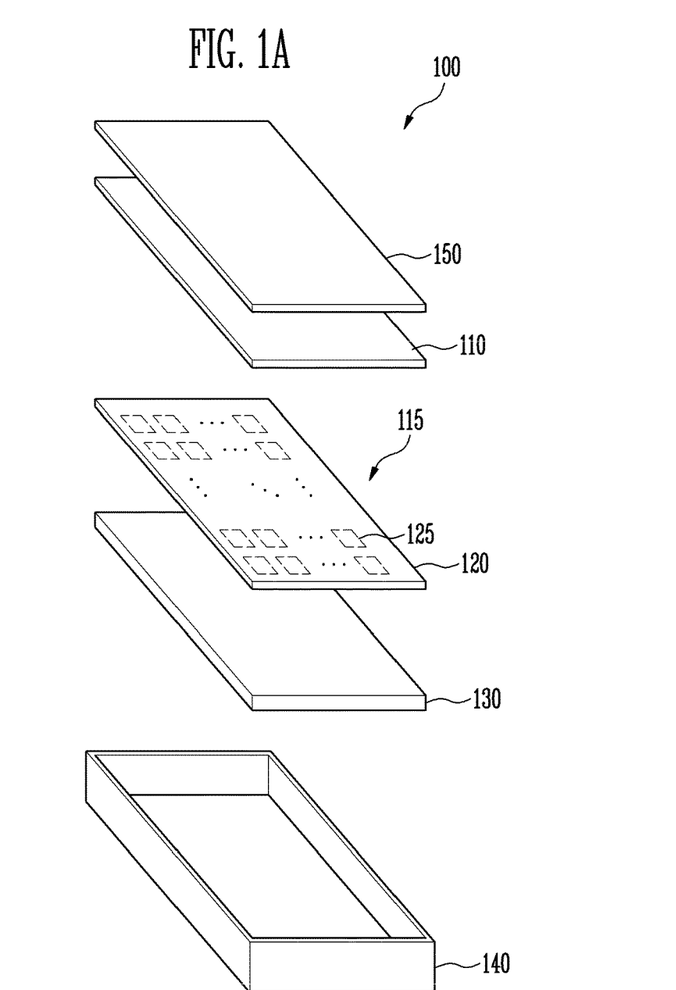
FIGS. 1A and 1B are views illustrating a configuration of a display device, according to an embodiment of the present disclosure.
Figure 1B:
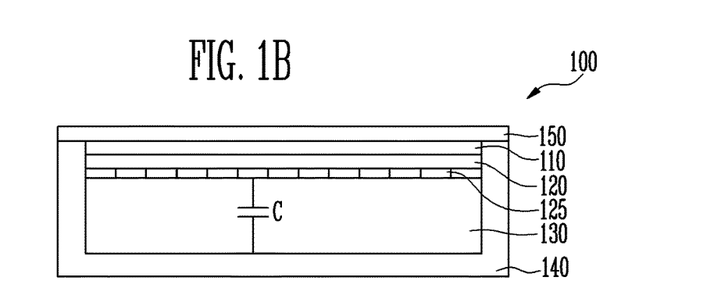

FIGS. 1A and 1B are views illustrating a configuration of a display device, according to an embodiment of the present disclosure.

Referring to FIGS. 1A and 1B, a display device 100 includes a display panel 110, a pressure sensor unit 115, a dielectric layer 130, a bracket 140, and a window 150.

The display panel 110 may include a plurality of pixels (not shown) to provide an image to a user.

The display panel 110 can display an image on at least one surface. A surface on which the image is displayed may be a flat surface having no curvature or a curved surface having a predetermined curvature. Alternatively, the surface on which the image is displayed may be temporarily flat, but may be bendable or rollable.

The display panel 110 can display an image. Examples of the display panel 110 may include, but are not limited to, an organic light emitting display panel, a liquid crystal display panel, an electrophoretic display panel, an electrowetting display panel, a MEMS display panel, and the like.

The pressure sensor unit 115 may include a substrate 120 and a plurality of pressure sensors 125.

The substrate 120 may be made of an insulating material such as glass, resin, or the like. Further, the substrate 120 may be made of a flexible material that can be bent or folded. The substrate 120 may have a single-layer structure or a multi-layer structure.

For example, the substrate 120 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, and the like.

However, the material forming the substrate 120 may be variously changed and be made of fiber reinforced plastic (FRP) or the like.

The pressure sensors 125 may include a conductive material.

In an embodiment of the present disclosure, the conductive material may include metals or an alloy thereof. The metals may be gold (Au), silver (Ag), aluminum (Al), molybdenum (Mo), chromium (Cr), titanium (Ti), nickel (Ni), neodymium (Nd), copper (Cu), platinum (Pt), and the like.

In an embodiment of the present disclosure, the pressure sensors 125 may be made of a transparent conductive material. Examples of the transparent conductive material may include, but are not limited to, silver nanowire (AgNW), indium tin oxide (ITO), indium zinc oxide (IZO), antimony zinc oxide (AZO), indium tin zinc oxide (ITZO), zinc oxide (ZnO), tin oxide (SnO2), carbon nanotube, graphene, and the like. The pressure sensors 125 may be made of a single layer or multiple layers, for example, multiple layers having a stacked structure including two or more materials selected from the materials described above.

Meanwhile, although each of the pressure sensors 125 is shown in a rectangular shape in FIGS. 1A and 1B, the present disclosure is not limited thereto, and instead the pressure sensors 125 may be changed into various shapes. In addition, the number and the arrangement of the pressure sensors 125 may vary depending on the shape and size of the display device 100.

An additional insulating layer (not shown) may be disposed on the substrate 120 and the pressure sensors 125. The pressure sensors 125 may be further protected from moisture, oxygen, and the like by the additional insulating layer.

Referring to FIG. 1B, a capacitance C may be formed between the pressure sensors 125 and the bracket 140, as will be described below in further detail.

The display device 100 may determine an intensity of a touch through a variation in the capacitance C that formed between the pressure sensors 125 and the bracket 140.

FIGS. 1A and 1B show that the pressure sensor unit 115 has the pressure sensors 125 that are provided on the substrate 120 and is disposed on one surface of the display panel 110. However, the pressure sensors 125 may be directly provided on the display panel 110 without the substrate 120.

The dielectric layer 130 may be positioned between the pressure sensor unit 115 and an inner bottom surface of the bracket 140.

Since the dielectric layer 130 forms the capacitance C between the pressure sensors 125 and the bracket 140, a value of the capacitance C may vary depending on a dielectric constant of the dielectric layer 130.

According to the present disclosure, the dielectric layer 130 may be divided into a plurality of areas, and the dielectric constant may be different for each area. Accordingly, a capacitance between the pressure sensors 125 and the bracket 140 may vary depending on the area.

The bracket 140 according to the present disclosure may accommodate the display panel 110, the pressure sensor unit 115, and the dielectric layer 130. That is, the dielectric layer 130, the pressure sensor unit 115, and the display panel 110 may be sequentially stacked in the bracket 140.

The bracket 140 may include a conductive material. The conductive material may include metals or an alloy thereof. Examples of the metals may include, but are not limited to, gold (Au), silver (Ag), aluminum (Al), molybdenum (Mo), chromium (Cr), titanium (Ti), nickel (Ni), neodymium (Nd), copper (Cu), platinum (Pt), and the like.

The bracket 140 may be formed of the same material as or a different material other than the conductive material that is used to form the pressure sensors 125.

The window 150 may be positioned on an upper surface of the display panel 110 and cover edges of the display panel 110 and the bracket 140 as shown in FIG. 1B. The window 150 may be coupled with the bracket 140 through an adhesive member of a fastening member.

In the present specification, a touch input to the display device 100 may indicate a touch input onto the window 150.

Figure 2A:
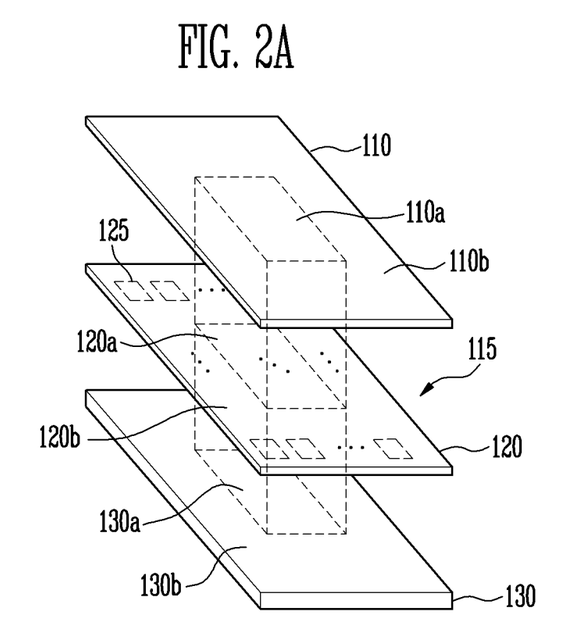
FIGS. 2A to 2C are views illustrating a display device provided with a dielectric layer including a first dielectric layer and a second dielectric layer, according to an embodiment of the present disclosure.
Figure 2B:
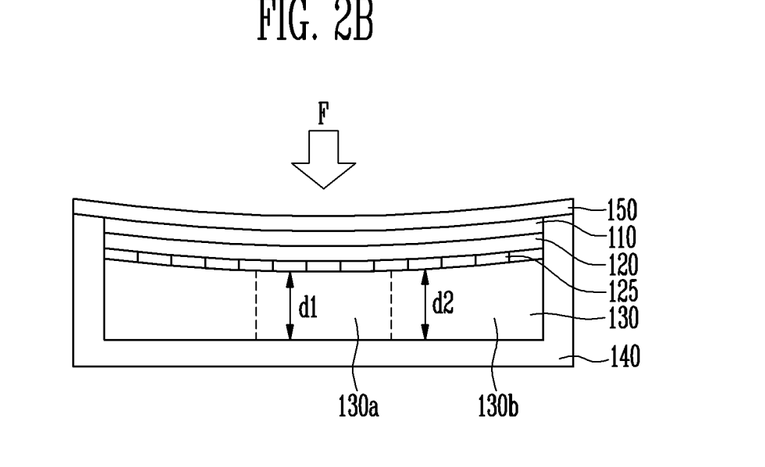
Figure 2C:
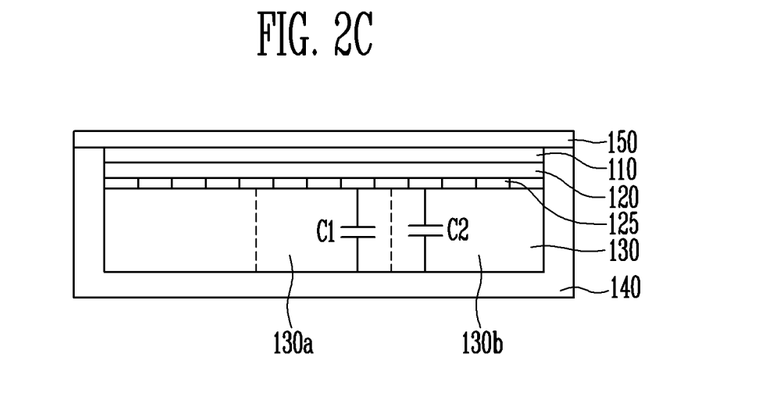

FIGS. 2A to 2C are views illustrating a display device provided with a dielectric layer including a first dielectric layer and a second dielectric layer, according to an embodiment of the present disclosure.

Referring to FIG. 2A, the display panel 110 may include a first area 110a and a second area 110b. Specifically, the first area 110a may include a center area of the display panel 110, and the second area 110b may be a peripheral area surrounding the first area 110a.

The pressure sensor unit 115 may also include a first area 120a and a second area 120b. Specifically, the first area 120a of the pressure sensor unit 115 may overlap the first area 110a of the display panel 110, and the second area 120b of the pressure sensor unit 115 may overlap the second area 110b of the display panel 110.

The dielectric layer 130 may include a first dielectric layer 130a and a second dielectric layer 130b. The first dielectric layer 130a may overlap the first area 110a of the display panel 110 and the first area 120a of the pressure sensor unit 115, and the second dielectric layer 130b may overlap the second area 110b of the display panel 110 and the second area 120b of the pressure sensor unit 115.

That is, the first dielectric layer 130a may be positioned at the center area of the dielectric layer 130, and the second dielectric layer 130b may surround the first dielectric layer 130a.

In FIG. 2A, for the convenience of explanation, the window 150 and the bracket 140 are omitted.

FIG. 2B shows a state in which a pressure F is applied to the display device.

Referring to FIG. 2B, when the pressure F is applied to the display device 100 according to a user's touch or the like, distances d1 and d2 between the pressure sensors 125 and the bracket 140 may be changed, so that the capacitance between the pressure sensors 125 and the bracket 140 may be changed.

A sensor controller of the display device may calculate the intensity of the touch with reference to the variation in the capacitance C between the pressure sensors 125 and the bracket 140.

The capacitance value between the pressure sensors 125 and the bracket 140 may vary depending on the dielectric constant of the dielectric layer 130 and the distances dl and d2 between the pressure sensors 125 and the bracket 140.

Specifically, as the dielectric constant of the dielectric layer 130 increases, the capacitance value may become greater, and as the distances d1 and d2 between the pressure sensor 125 and the bracket 140 decrease, the capacitance value may become greater.

The bracket 140 may include sidewalls to form a cavity for accommodating the display panel 110, the pressure sensor unit 115, and the dielectric layer 130. The window 150 may cover both the bracket 140 and the display panel 110.

That is, due to the structure of the display device 100 as described above, although the display device 100 is touched with the same force, a depth to which the display device 100 is pressed may vary depending on the position of a touch input.

Specifically, as the position of the touch input is closer to an edge of the display device 100 (for example, an area corresponding to the second dielectric layer 130b), the display device 100 may be less pressed due to the sidewalls of the bracket 140.

Although the display device 100 is touched with the same force, the distance between the pressure sensor 125 and the bracket 140 may vary depending on the position of the touch input. Thus, the variation in the capacitance C may also be changed depending on the position of the touch input.

That is, although the display device 100 is touched by the user with the same force, the intensity of a touch calculated by the display device 100 may be different depending on the position of the touch input.

According to an embodiment, to equalize the intensity of a touch input, a dielectric constant of the first dielectric layer 130a and a dielectric constant of the second dielectric layer 130b may be differently chosen.

Referring to FIG. 2C, when no touch input is provided to the display device 100, a capacitance value between the pressure sensors 125 and the bracket 140 corresponding to the first dielectric layer 130a may have a capacitance value C1, and a capacitance value between the pressure sensors 125 and the bracket 140 corresponding to the second dielectric layer 130b may have a capacitance value C2.

According to one embodiment, the dielectric constant of the second dielectric layer 130b may be greater than that of the first dielectric layer 130a. Therefore, the capacitance value C2 may be greater than the capacitance value C1 when there is no touch input.

That is, a uniform intensity of a touch that is irrespective of a touch position may be detected by choosing proper dielectric constants of the first and second dielectric layers 130a and 130b to account for a difference in the depth to which the display device 100 is pressed due to the sidewalls of the bracket 140 that are positioned along the perimeter of the display device 100.

Figure 3:
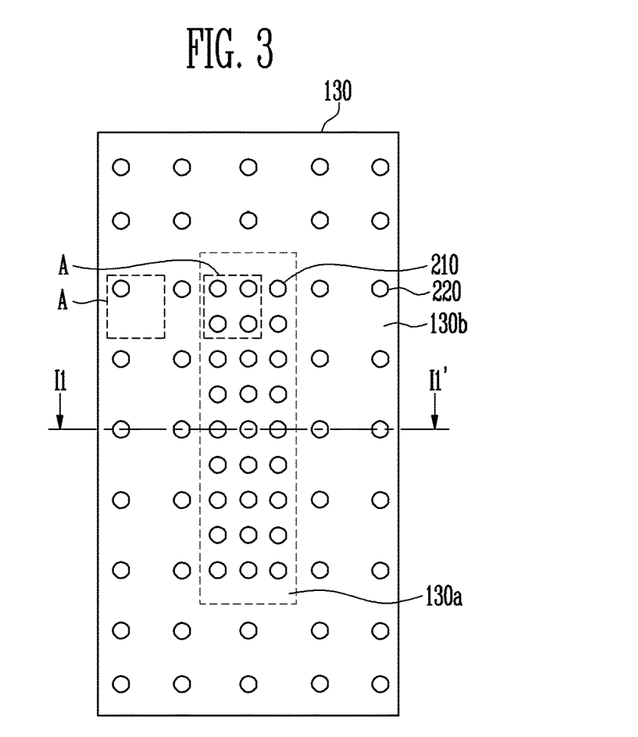
FIG. 3 is a view illustrating a dielectric layer including a hole, according to an embodiment of the present disclosure.
Figure 4:
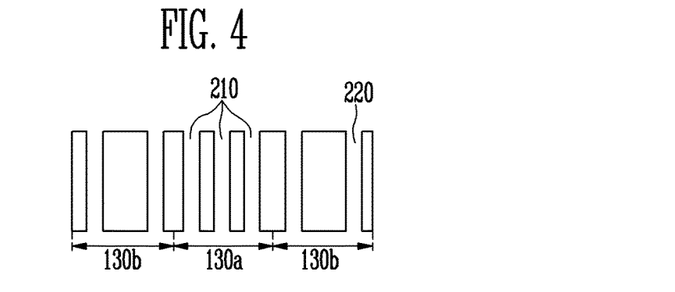
FIG. 4 is a cross-sectional view illustrating an embodiment taken along line I1-I1' of FIG. 3.

FIG. 3 is a view illustrating a dielectric layer including a hole, according to an embodiment of the present disclosure, and FIG. 4 is a cross-sectional view illustrating an embodiment taken along line I1-I1' of FIG. 3.

Referring to FIGS. 3 and 4, the first dielectric layer 130a may include a first hole 210 and the second dielectric layer 130b may include a second hole 220.

The first dielectric layer 130a and the second dielectric layer 130b may be formed of the same dielectric material, and the radiuses of the first and second holes 210 and 220 may be the same as each other.

In addition, the first hole 210 may not be filled with a dielectric material forming the dielectric layer 130a and may be formed through the dielectric layer 130a as shown in FIG. 4.

Since a dielectric constant value of the first hole 210 is smaller than that of an area filled with the dielectric material with no holes, an effective dielectric constant of the first dielectric layer 130a may be reduced by forming the first hole 210 in the first dielectric layer 130a.

The second hole 220 may not be filled with a dielectric material forming the second dielectric layer 130b and may be formed though the second dielectric layer 130b as shown in FIG. 4.

Since a dielectric constant value of the second hole 220 is smaller than that of an area filled with the dielectric material with no holes, an effective dielectric constant of the second dielectric layer 130b may be reduced by forming the second hole 220 in the second dielectric layer 130b.

According to the present disclosure, the number of first holes 210 included in a unit area A may be greater than the number of second holes 220 included in the unit area A.

Accordingly, the effective dielectric constant of the first dielectric layer 130a may be smaller than the effective dielectric constant of the second dielectric layer 130b.

Figure 5:
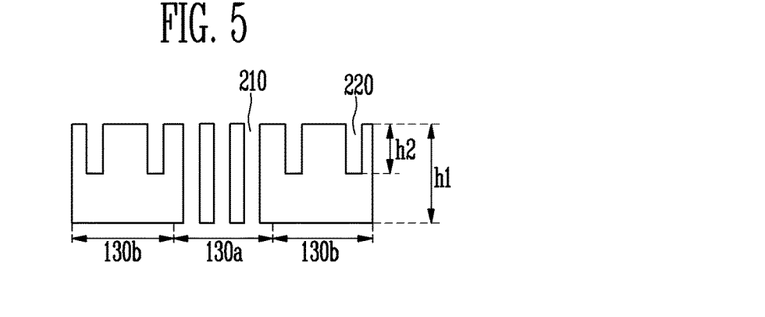
FIG. 5 is a cross-sectional view illustrating another embodiment taken along line I1-I1' of FIG. 3.

FIG. 5 is a cross-sectional view illustrating another embodiment taken along line I1-I1' of FIG. 3.

Referring to FIG. 5, a height h1 of the first hole 210 may be greater than a height h2 of the second hole 220.

For example, the first hole 210 may be formed through the entire first dielectric layer 130a, and the second hole 220 may be formed by removing a portion of the second dielectric layer 130b.

That is, the effective dielectric constant of the first dielectric layer 130a may be set to be lower than that of the second dielectric layer 130b by increasing a volume of the first hole 210 compared to a volume of the second hole 220.

FIG. 5 shows that the first hole 210 penetrates the entire first dielectric layer 130a, but the present disclosure is not limited thereto. That is, in the same manner as the second hole 220, the first hole 210 may be formed by removing a portion of the first dielectric layer 130a.

In addition, when the heights h1 and h2 of the first and second holes 220 and 220 are different from each other, the number of first holes 210 included in the unit area A may not be greater than the number of second holes 220 included in the unit area A. The radiuses of the first hole 210 and the second hole 220 may not be the same as each other.

Figure 6:
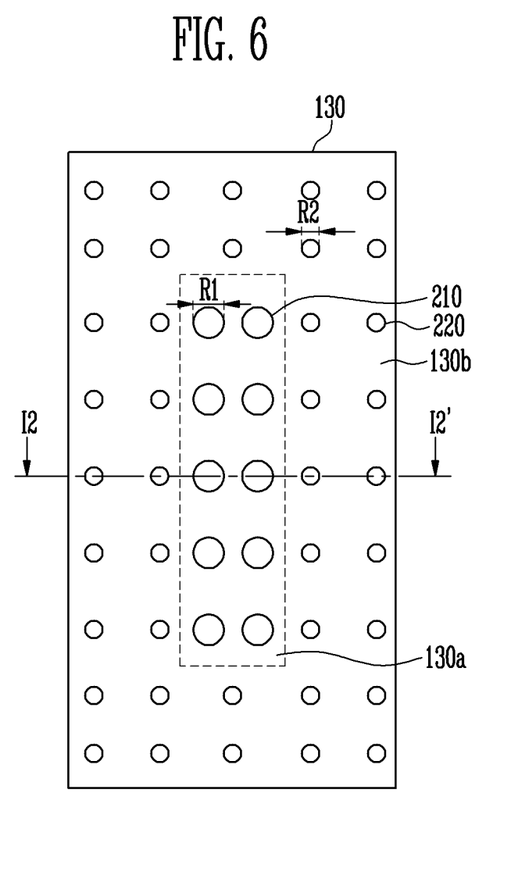
FIG. 6 is a view illustrating a dielectric layer including a hole, according to another embodiment of the present disclosure.
Figure 7:
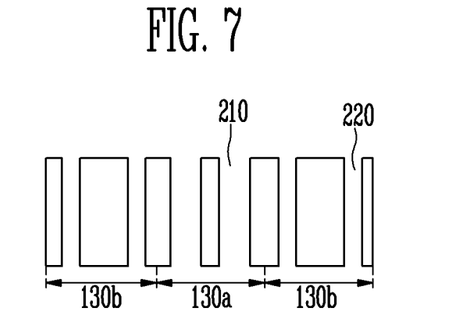
FIG. 7 is a cross-sectional view illustrating an embodiment taken along line I2-I2' of FIG. 6.

FIG. 6 is a view illustrating a dielectric layer including a hole, according to another embodiment of the present disclosure, and FIG. 7 is a cross-sectional view illustrating an embodiment taken along line I2-I2' of FIG. 6.

Referring to FIGS. 6 and 7, the first dielectric layer 130a may include the first hole 210, and the second dielectric layer 130b may include the second hole 220.

The first dielectric layer 130a and the second dielectric layer 130b may be formed of the same dielectric material.

The first hole 210 may not be filled with the dielectric material forming the first dielectric layer 130a and may be formed through the first dielectric layer 130a as shown in FIG. 7.

Since the dielectric constant value of the first hole 210 is smaller than that of the area filled with the dielectric material with no holes, the effective dielectric constant of the first dielectric layer 130a may be reduced by forming the first hole 210 in the first dielectric layer 130a.

The second hole 220 may not be filled with the dielectric material forming the second dielectric layer 130b and may be formed through the second dielectric layer 130b as shown in FIG. 7.

Since the dielectric constant value of the second hole 220 is smaller than that of the area filled with the dielectric material with no holes, the effective dielectric constant of the second dielectric layer 130b may be reduced by forming the second hole 220 in the second dielectric layer 130b.

Specifically, a radius R2 of the second hole 220 may be smaller than a radius R1 of the first hole 210.

That is, the effective dielectric constant of the first dielectric layer 130a may be set to be lower than that of the second dielectric layer 130b by increasing a volume of the first hole 210 compared to a volume of the second hole 220.

Figure 8:
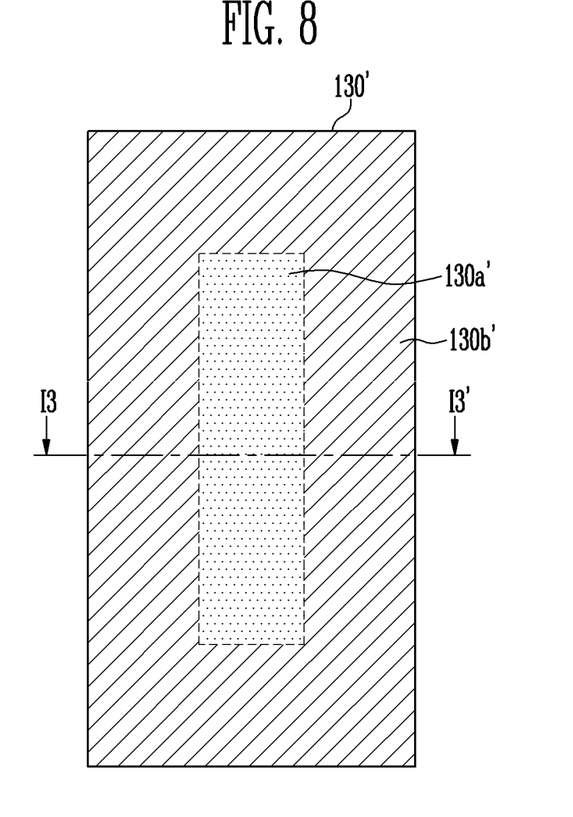
FIG. 8 is a view illustrating a dielectric layer, according to another embodiment of the present disclosure.
Figure 9:
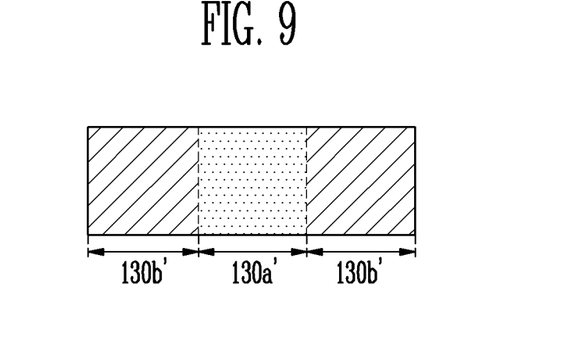
FIG. 9 is a cross-sectional view illustrating an embodiment taken along line I3-I3' of FIG. 8.

FIG. 8 is a view illustrating a dielectric layer, according to another embodiment of the present disclosure, and FIG. 9 is a cross-sectional view illustrating an embodiment taken along line I3-I3' of FIG. 8.

Referring to FIGS. 8 and 9, a dielectric layer 130' according to the present disclosure may include a first dielectric layer 130a' and a second dielectric layer 130b'.

The first dielectric layer 130a' may be located at the center area of the dielectric layer 130', and the second dielectric layer 130b' may surround the first dielectric layer 130a'.

The first dielectric layer 130a' may be formed of a first dielectric material, and the second dielectric layer 130b' may be formed of a second dielectric material.

A dielectric constant of the first dielectric material and a dielectric constant of the second dielectric material may be different from each other. Specifically, the dielectric constant of the first dielectric material may be smaller than the dielectric constant of the second dielectric material.

That is, as described with reference to FIGS. 3 to 7, the first dielectric layer 130a and the second dielectric layer 130b may be formed of the same material, and the effective dielectric constants of the first and second dielectric layers 130a and 130b may be controlled by varying the numbers or the sizes of the first holes 210 and the second holes 220. However, unlike the first dielectric layer 130a and the second dielectric layer 130b, the effective dielectric constants of the first and second dielectric layer 130a' and 130b' may be controlled by varying the dielectric materials forming the first and second dielectric layer 130a' and 130b'.

FIGS. 1 to 9 show that the dielectric layers include the first dielectric layers 130a and 130a' and the second dielectric layers 130b and 130b', and the second dielectric layers 130b and 130b' surround the first dielectric layers 130a and 130a' that are positioned at the center areas of the dielectric layers 130 and 130', but the present disclosure is not limited thereto.

That is, the dielectric layer according to the present disclosure may be partitioned into various shapes depending on the shape, size, and the like of the display device 100.

Figure 10A:
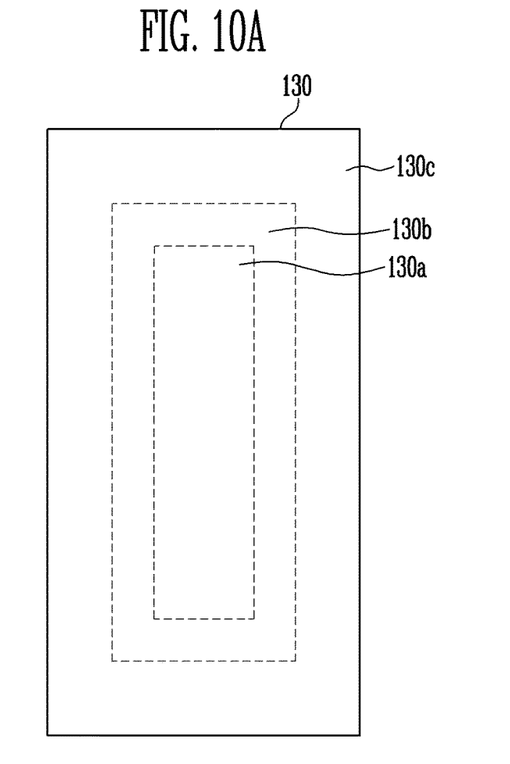
FIGS. 10A and 10B are views illustrating a dielectric layer, according to another embodiment of the present disclosure.
Figure 10B:
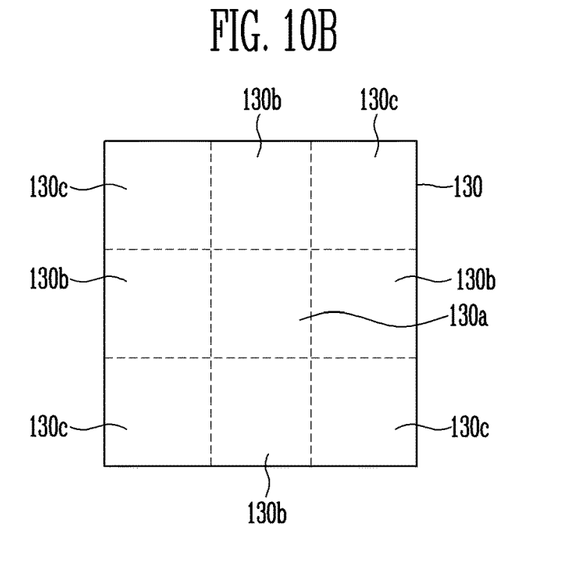

FIGS. 10A and 10B are views illustrating a dielectric layer, according to another embodiment of the present disclosure.

Referring to FIG. 10A, the dielectric layer 130 may include the first dielectric layer 130a, the second dielectric layer 130b, and a third dielectric layer 130c.

The first dielectric layer 130a may be positioned at the center area of the dielectric layer 130 and the second dielectric layer 130b may surround the first dielectric layer 130a.

The third dielectric layer 130c may surround the second dielectric layer 130b.

In such a case, a dielectric constant of the second dielectric layer 130b may be greater than that of the first dielectric layer 130a, and a dielectric constant of the third dielectric layer 130c may be greater than that of the second dielectric layer 130b.

That is, the third dielectric layer 130c located at outer areas of the dielectric layer 130 may have the greatest dielectric constant among the dielectric layers 130a, 130b, and 130c.

For example, the third dielectric layer 130c may include a smaller number of holes than the number of holes provided in the first dielectric layer 130a and the second dielectric layer 130b.

Alternatively, the third dielectric layer 130c may include holes having a smaller radius than the radiuses of the holes provided in the first dielectric layer 130a and the second dielectric layer 130b.

Alternatively, the third dielectric layer 130c may include holes having a smaller height than the heights of the holes provided in the first dielectric layer 130a and the second dielectric layer 130b.

Alternatively, the third dielectric layer 130c may be formed of a dielectric material having a higher dielectric constant than the dielectric constants of the dielectric materials forming the first dielectric layer 130a and the second dielectric layer 130b.

Referring to FIG. 10B, the dielectric layer 130 may include the first dielectric layer 130a, the second dielectric layer 130b, and the third dielectric layer 130c.

The first dielectric layer 130a may be positioned at the center area of the dielectric layer 130 and the second dielectric layer 130b may be positioned in a periphery of the first dielectric layer 130a.

The third dielectric layer 130c may be positioned in peripheries of the first dielectric layer 130a and the second dielectric layer 130b, and may be particularly positioned at the corner areas of the dielectric layer 130.

In such a case, the dielectric constant of the second dielectric layer 130b may be greater than that of the first dielectric layer 130a, and the dielectric constant of the third dielectric layer 130c may be greater than that of the second dielectric layer 130b.

That is, the third dielectric layer 130c located at the corners of the dielectric layer 130 may have the greatest dielectric constant among the dielectric layers 130a, 130b, and 130c.

For example, the third dielectric layer 130c may include a smaller number of holes than the number of holes provided in the first dielectric layer 130a and the second dielectric layer 130b.

Alternatively, the third dielectric layer 130c may include the holes having a smaller radius than the radiuses of the holes provided in the first dielectric layer 130a and the second dielectric layer 130b.

Alternatively, the third dielectric layer 130c may include the holes having a smaller height than the heights of the holes provided in the first dielectric layer 130a and the second dielectric layer 130b.

Alternatively, the third dielectric layer 130c may be formed of the dielectric material having the higher dielectric constant than the dielectric constants of the dielectric materials forming the first dielectric layer 130a and the second dielectric layer 130b.

Due to the sidewalls of the bracket 140, a touch input having the same intensity of force may result in a different depth to which the display device 100 is pressed depending on a position of the touch input. According to one embodiment, a dielectric constant of the dielectric layer 130 corresponding to an area where the display device 100 is least pressed, for example, a peripheral area close to the sidewalls of the bracket 140 may be increased.

It is shown that the first, second, and third dielectric layers 130a, 130b, and 130c may have a rectangular shape, but the present disclosure is not limited thereto. For example, the dielectric layer 130 may be partitioned to have a polygonal shape, or a circular (or an elliptical) shape.

According to an embodiment of the present disclosure, as described above, the capacitance C formed between the pressure sensors 125 and the bracket 140 may vary by setting different dielectric constants for each area of the dielectric layer 130.

Alternatively, according to another embodiment of the present disclosure, the capacitance C formed between the pressure sensors 125 and the bracket 140 may vary by differently setting a distance between the pressure sensors 125 and the bracket 140 according to each area.

Figure 11:
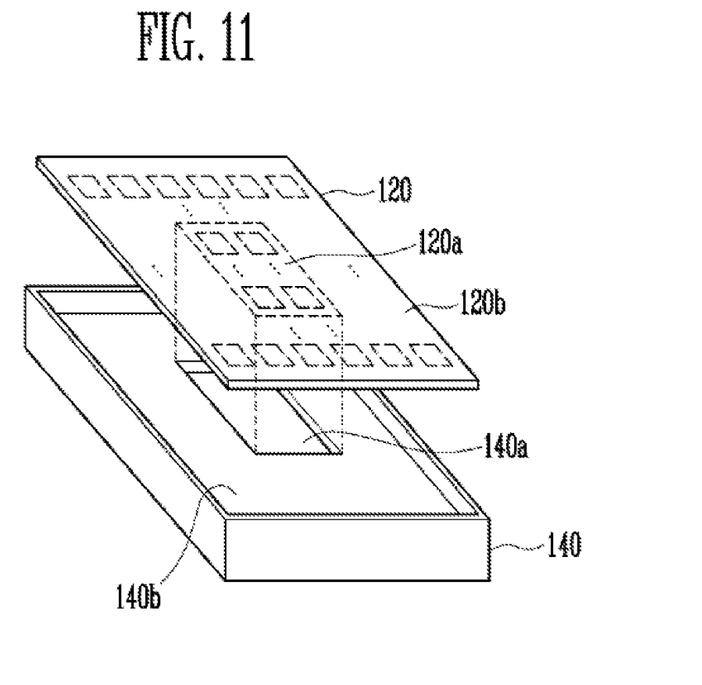
FIGS. 11 and 12 are views illustrating a partial configuration of a display device including a bracket, according to another embodiment of the present disclosure.
Figure 12:
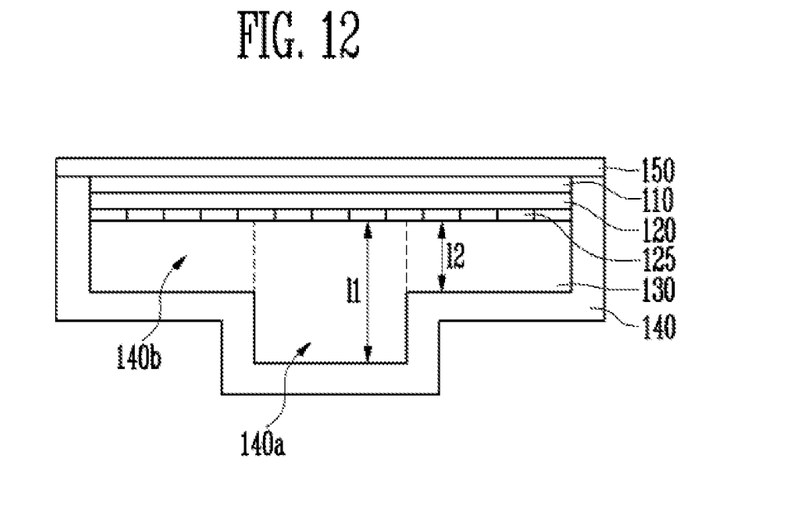

FIGS. 11 and 12 are views illustrating a partial configuration of a display device including a bracket, according to another embodiment of the present disclosure. In FIG. 11, for the convenience of explanation, a display panel, a dielectric layer, and a window are omitted.

Referring to FIG. 11, the pressure sensor unit 115 may include the first area 120a and the second area 120b. Specifically, the first area 120a of the pressure sensor unit 115 may include the center area of the pressure sensor unit 115, and the second area 120b may be a peripheral area surrounding the first area 120a.

The bracket 140 may include a first cavity 140a and a second cavity 140b.

An area where the first cavity 140a is formed may overlap the first area 120a of the pressure sensor unit 115, and an area where the second cavity 140b is formed may overlap the second area 120b of the pressure sensor unit 115.

There may be a step difference between the first cavity 140a and the second cavity 140b so that a cavity of the bracket 140 may have a stepped shape.

Therefore, as shown in FIG. 12, a distance 11 between the pressure sensors 125 and the bracket 140 corresponding to the first area 120a of the pressure sensor unit 115 may be set to be greater than a distance 12 between the pressure sensors 125 and the bracket 140 corresponding to the second area 120b.

The capacitance between the pressure sensor 125 and the bracket 140 may be inversely proportional to the distance between the pressure sensors 125 and the bracket 140. Therefore, the capacitance between the pressure sensors 125 and the bracket 140 corresponding to the first area 140a may be smaller than the capacitance between the pressure sensor 125 and the bracket 140 corresponding to the second area 140b.

Figure 13:
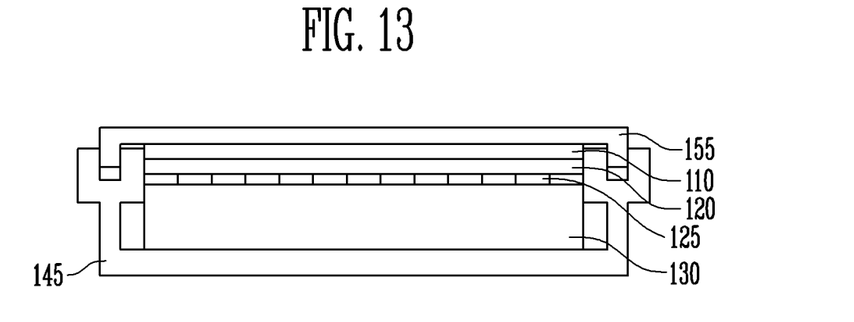
FIG. 13 is a view illustrating a display device including a bracket and a window, according to another embodiment of the present disclosure.

FIG. 13 is a view illustrating a display device including a bracket and a window, according to another embodiment of the present disclosure.

Referring to FIG. 13, a bracket 145 may include a buffer unit 145a.

The buffer unit 145a may extend along a sidewall of the bracket 145, and a groove may be formed in the buffer unit 145a.

A window 155 may include a protrusion 155a extending along an edge of the bracket 145.

The window 155 may be fastened to the buffer unit 145a. Specifically, the protrusion 155a of the window 155 may be coupled with the groove of the buffer 145a.

When the window 155 moves up and down by a force applied thereto, there may be an empty space between the protrusion 155a of the window 155 and the buffering unit 145a that prohibits a direct contact between the protrusion 155a of the window 155 and the buffering unit 145a.

Therefore, regardless of the position of a touch input to the display device 100, the window 155 may move to the same amount of depth without being affected by the sidewall of the bracket 145.

Figure 14:
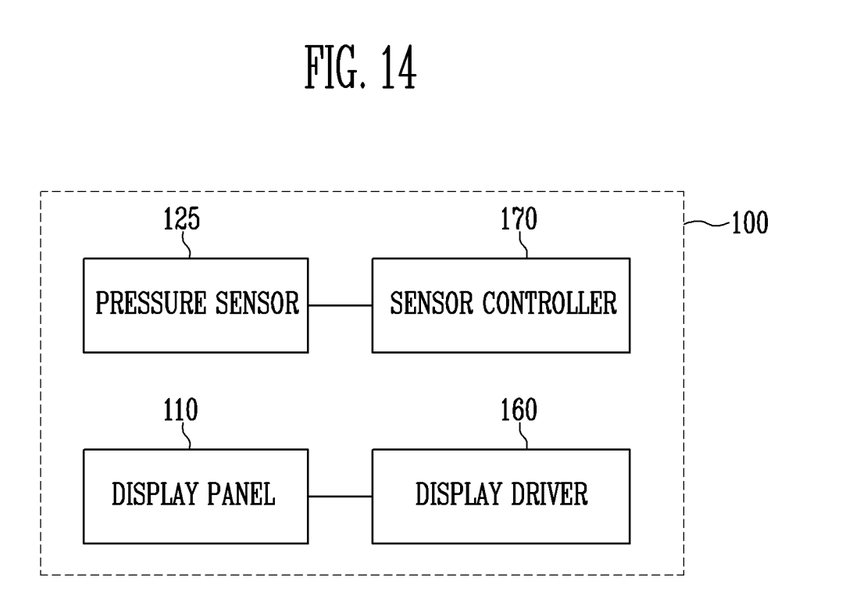
FIG. 14 is a view illustrating a display device including a sensor controller and a display driver, according to an embodiment of the present disclosure.

FIG. 14 is a view illustrating a display device including a sensor controller and a display driver, according to an embodiment of the present disclosure.

Referring to FIG. 14, the display device 100 may further include a display driver 160 and a sensor controller 170.

The display driver 160 may control an image display operation of the display panel 110 by supplying an image driving signal to the display panel 110.

The display driver 160 may generate the image driving signal using image data and a control signal supplied from an outside component or device.

For example, the display driver 160 may be supplied with the image data and the control signal from a host (not shown), and the control signal may include a vertical synchronization signal, a horizontal synchronization signal, a main clock signal, and the like.

In addition, the image driving signal may include a data signal generated by using a scan signal and image data DATA.

The sensor controller 170 may sense the intensity of a pressure by detecting a variation in the capacitance depending on a distance between the pressure sensors 125 and the bracket 140.

Specifically, the sensor controller 170 may calculate the intensity of the pressure with reference to a signal obtained from the pressure sensors 125 and a correction constant.

Due to the structure of the display device 100 as described above, although the display device 100 is touched with the same amount of force, the depth to which the display device 100 is pressed may vary depending on a position of the touch input.

Specifically, as the position of the touch input is closer to the edge of the display device 100, the display device 100 may be less pressed due to the sidewall of the bracket 140.

Accordingly, the sensor controller 170 may apply a greater correction constant as the position of the touch input is closer to the edge of the display device 100.

Accordingly, when the touch is input with the same amount of force, a uniform intensity of a finally calculated touch pressure may be obtained regardless of a touch position.

A correction constant corresponding to a position of the touch input may be stored in a memory (not shown).

The display driver 160 and the sensor controller 170 may be integrated into one configuration. For example, the display driver 160 and the sensor controller 170 may be embodied as a single integrated circuit (IC).

According to the present disclosure, an intensity of a touch input may be calculated by setting a capacitance formed between the pressure sensors 125 and the brackets 140 and 145 corresponding to the first area of the display device 100 and a capacitance between the pressure sensors 125 and the brackets 140 and 145 corresponding to the second area of the display device 100 to be different from each other and applying a correction constant in calculating a touch intensity of the touch input.

Alternatively, the sensor controller 170 may calculate the intensity of the touch by using only the correction constant described above.

According to an embodiment of the present disclosure, a display device detecting an intensity of a touch may be provided.

According to the present disclosure, a display device is capable of recognizing a uniform intensity of a touch regardless of a position of a touch input.

It will be apparent to those skilled in the art that the present disclosure may be embodied in other specific forms without departing from the spirit or essential characteristics thereof. It is therefore to be understood that the above-described embodiments are illustrative in all aspects and not restrictive. The scope of the present disclosure is defined by the appended claims rather than by the foregoing description, and all changes or modifications derived from the meaning and scope of the claims and the equivalents thereof are included in the scope of the present disclosure.

What is claimed is:

1. A display device, comprising:
a display panel including a first area and a second area surrounding the first area;
a plurality of pressure sensors disposed on the display panel;
a dielectric layer disposed on the plurality of pressure sensors; and
a bracket accommodating the display panel, the plurality of pressure sensors, and the dielectric layer,
wherein a capacitance is formed between the plurality of pressure sensors and the bracket, and includes a first capacitance corresponding to the first area and a second capacitance corresponding to the second area,
wherein the first capacitance is smaller than the second capacitance,
wherein the dielectric layer includes a first dielectric layer and a second dielectric layer,
wherein the first dielectric layer includes a first hole and the second dielectric layer includes a second hole,
wherein a number of first holes provided in a unit area of the first dielectric layer away from edges of the dielectric layer is greater than a number of second holes provided in the unit area of the second dielectric layer that is closer to the edges of the dielectric layer.

2. The display device of claim 1, wherein
a first dielectric constant of the first dielectric layer is smaller than a second dielectric constant of the second dielectric layer.

3. The display device of claim 2, wherein the first dielectric layer overlaps the first area, and the second dielectric layer overlaps the second area.

4. The display device of claim 1, wherein
a second height of the second hole is smaller than a first height of the first hole.

5. The display device of claim 4, wherein the first hole is formed through the first dielectric layer, and
the second hole is formed by removing a portion of the second dielectric layer.

6. The display device of claim 1, wherein the first area includes a center area of the display panel.

7. The display device of claim 1, wherein the first dielectric layer and the second dielectric layer are made of materials having different dielectric constants from each other.

8. The display device of claim 1, wherein the bracket includes a first cavity and a second cavity, and
the first cavity overlaps the first area, and the second cavity overlaps the second area.

9. The display device of claim 8, wherein a step is formed between the first cavity and the second cavity and a bottom surface of the bracket has a stepped shape.

10. The display device of claim 9, wherein a distance between the pressure sensors disposed on the first area and the bracket corresponding to the first cavity is greater than a distance between the pressure sensors disposed on the second area and the bracket corresponding to the second cavity.

11. The display device of claim 1, further comprising a sensor controller calculating an intensity of a touch with reference to a variation in the capacitance between the plurality of pressure sensors and the bracket and correction constants.

12. The display device of claim 11, wherein a first correction constant applied when the touch is input to the first area is different from a second correction constant applied when the touch is input to the second area.

13. A display device, comprising:
a display panel including a first area and a second area surrounding the first area;
a plurality of pressure sensors disposed on the display panel;
a dielectric layer disposed on the plurality of pressure sensors; and
a bracket accommodating the display panel, the plurality of pressure sensors, and the dielectric layer, wherein a capacitance is formed between the plurality of pressure sensors and the bracket, and includes a first capacitance corresponding to the first area and a second capacitance corresponding to the second area, wherein the dielectric layer includes a first dielectric layer and a second dielectric layer, wherein the first dielectric layer includes a first hole and the second dielectric layer includes a second hole, and wherein a second hole provided in the second dielectric layer has a second radius that is smaller than a first radius of the first hole provided in the first dielectric layer.

* * * * *